(12) United States Patent
Nawa

(10) Patent No.: US 10,742,154 B2
(45) Date of Patent: Aug. 11, 2020

(54) MOTOR DRIVING DEVICE

(71) Applicant: KABUSHIKI KAISHA TOYOTA JIDOSHOKKI, Kariya-shi, Aichi-ken (JP)

(72) Inventor: Masamichi Nawa, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 0 days.

(21) Appl. No.: 16/093,740

(22) PCT Filed: Mar. 31, 2017

(86) PCT No.: PCT/JP2017/013745
§ 371 (c)(1),
(2) Date: Oct. 15, 2018

(87) PCT Pub. No.: WO2017/183426
PCT Pub. Date: Oct. 26, 2017

(65) Prior Publication Data
US 2019/0123675 A1 Apr. 25, 2019

(30) Foreign Application Priority Data

Apr. 18, 2016 (JP) ................. 2016-082882

(51) Int. Cl.
*H02P 27/06* (2006.01)
*H02M 7/537* (2006.01)
(Continued)

(52) U.S. Cl.
CPC ............. *H02P 27/06* (2013.01); *H01F 17/04* (2013.01); *H02M 1/12* (2013.01); *H02M 1/126* (2013.01);
(Continued)

(58) Field of Classification Search
CPC . H02P 27/06; H02M 7/537; H02M 2001/123; H02M 1/12; H01F 2017/0093; H01F 17/04
See application file for complete search history.

(56) References Cited

U.S. PATENT DOCUMENTS

2011/0050136 A1* 3/2011 Sumi ..................... B60L 3/04
  318/400.3
2012/0275201 A1* 11/2012 Koyama ................. H02M 7/48
  363/40

FOREIGN PATENT DOCUMENTS

| JP | 3644315 B2 | 4/2005 |
| JP | 2008-220109 A | 9/2008 |
| JP | 2015-076979 A | 4/2015 |

OTHER PUBLICATIONS

International Preliminary Report on Patentability with translation of Written Opinion dated Oct. 23, 2018, issued by the International Searching Authority in application No. PCT/JP2017/013745.

(Continued)

*Primary Examiner* — Kawing Chan
*Assistant Examiner* — Bradley R Brown
(74) *Attorney, Agent, or Firm* — Sughrue Mion, PLLC

(57) ABSTRACT

This motor driving device is provided with a direct-current power supply, an inverter, and a noise filter. The noise filter is provided with: a choke coil, wherein a first winding and a second winding are wound on a common core, and the first winding is inserted into a positive electrode bus; and two capacitors connected in series between the positive electrode bus and a negative electrode bus. One end of the second winding is connected to a neutral point of a three-phase motor, and another end of the second winding is connected to a wire between the two capacitors.

3 Claims, 3 Drawing Sheets

(51) Int. Cl.
*H02M 1/12* (2006.01)
*H01F 17/04* (2006.01)
*H02M 7/48* (2007.01)
*H02M 7/5387* (2007.01)
*H01F 17/00* (2006.01)

(52) U.S. Cl.
CPC ............ *H02M 7/48* (2013.01); *H02M 7/537* (2013.01); *H02M 7/5387* (2013.01); *H01F 2017/0093* (2013.01); *H02M 2001/123* (2013.01)

(56) References Cited

OTHER PUBLICATIONS

International Search Report of PCT/JP2017/013745 dated Jun. 13, 2017 [PCT/ISA/210].

* cited by examiner

MOTOR DRIVING DEVICE

TECHNICAL FIELD

The present invention relates to a motor driving device.

BACKGROUND ART

A typical inverter includes a noise filter. The noise filter reduces common mode noise and normal mode noise. Patent Document 1 discloses an inverter device that converts the output of an alternating-current (AC) power supply into direct-current (DC) power with a rectifier, converts the DC power into desired AC power with an inverter circuit, and supplies the AC power to a load. In this case, current flows between an AC neutral point of the load and an output neutral point of the rectifier. The inverter device includes means for generating a cancellation current that cancels the current with current flowing from the output AC neutral point of the AC power supply toward ground to reduce leakage current resulting from potential fluctuation at the AC neutral point of the load.

PRIOR ART DOCUMENT

Patent Document

Patent Document 1: Japanese Patent No. 3644315

SUMMARY OF THE INVENTION

Problems That are to be Solved by the Invention

In a typical noise filter, a filter constant is increased to improve the filtering effect. When the filter constant is increased to improve the filtering effect, the inverter device will be increased in the number of components, size, and cost regardless of power conversion, which is the main purpose of the inverter.

The inverter device disclosed in Patent Document 1 requires a sensing resistor. Further, the noise-reducing effect is low in the inverter device.

It is an object of the present invention to provide a motor driving device that reduces noise with a simple configuration.

Means for Solving the Problem

One aspect of the present invention, which achieves the above object, provides a motor driving device for a multiphase motor including star-connected coils. The motor driving device includes a DC power supply, an inverter, and a noise filter. The inverter has a plurality of switching elements for configuring upper and lower arms for each phase between a positive bus and a negative bus connected to the DC power supply. The inverter is configured to convert DC power from the DC power supply into AC power by performing a switching operation with the switching elements. The noise filter is configured to reduce noise propagating from the inverter to the DC power supply. The noise filter includes a choke coil and two capacitors. The choke coil has a first winding and a second winding wound around a common core. The first winding is inserted into the positive bus. The two capacitors are connected in series between the positive bus and the negative bus. One end of the second winding is connected to a neutral point of the multiphase motor and another end of the second winding is connected to a wire between the two capacitors.

EMBODIMENTS OF THE INVENTION

One embodiment of the present invention will now be described with reference to the drawings.

Figure 1A:
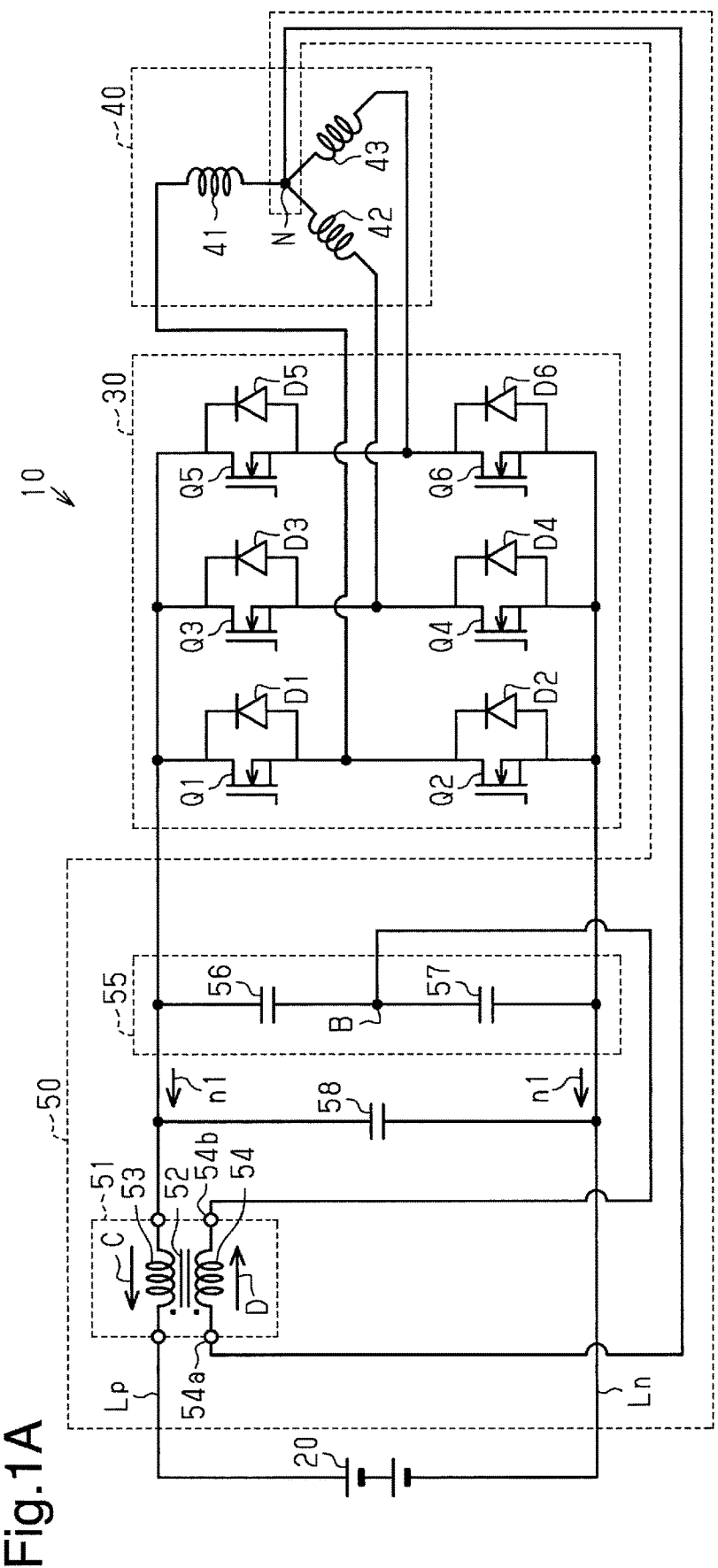
FIG. 1A is a diagram illustrating the configuration of a motor driving device according to one embodiment.

As shown in FIG. 1A, a motor driving device 10, serving as an on-board device, is a device that drives a three-phase motor 40. The motor driving device 10 includes a DC power supply 20, an inverter 30, and a noise filter 50.

The three-phase motor 40, serving as a multiphase motor, includes three coils 41, 42, and 43 that are star-connected. The DC power supply 20 is an on-board battery.

The inverter 30 includes switching elements Q1 and Q2 that configure U phase upper and lower arms, switching elements Q3 and Q4 that configure V phase upper and lower arms, and switching elements Q5 and Q6 that configure W phase upper and lower arms. A positive bus Lp and a negative bus Ln are connected to the DC power supply 20. Between the positive bus Lp and the negative bus Ln, the switching elements Q1 and Q2 are connected in series, the switching elements Q3 and Q4 are connected in series, and the switching elements Q5 and Q6 are connected in series.

A wire between the switching element Q1 and the switching element Q2 is connected to one end of the coil 41 of the three-phase motor 40. A wire between the switching element Q3 and the switching element Q4 is connected to one end of the coil 42 of the three-phase motor 40. A wire between the switching element Q5 and the switching element Q6 is connected to one end of the coil 43 of the three-phase motor 40. Diodes D1, D2, D3, D4, D5, and D6 are connected in antiparallel to the switching elements Q1, Q2, Q3, Q4, Q5, and Q6, respectively.

In this manner, the inverter 30 includes the switching elements Q1, Q2, Q3, Q4, Q5, and Q6 configuring the upper and lower arms for each phase between the positive bus Lp and the negative bus Ln, which are connected to the DC power supply 20. The inverter 30 converts DC power from the DC power supply 20 into AC power by performing switching operations on the switching elements Q1, Q2, Q3, Q4, Q5, and Q6 and supplies the AC power to the three-phase motor 40 serving as a multiphase motor, which includes the star-connected coils 41, 42, and 43.

The noise filter 50 is configured to reduce noise propagating from the inverter 30 to the DC power supply 20.

Figure 1B:
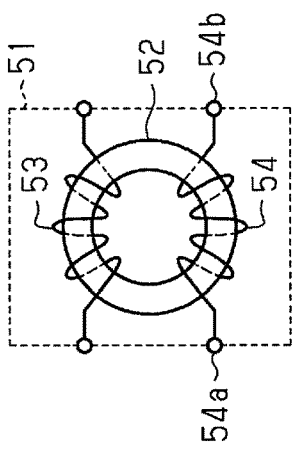
FIG. 1B is a schematic diagram illustrating the configuration of a choke coil.

The noise filter 50 includes a choke coil 51. As shown in FIG. 1B, the choke coil 51 includes a core 52, a first winding 53, and a second winding 54. The first winding 53 and the second winding 54 are wound around the common core 52. The filter constant of the choke coil 51 may be set to a small value.

As shown in FIG. 1A, the first winding 53 of the choke coil 51 is inserted into the positive bus Lp.

The noise filter 50 includes a capacitor pair 55. The capacitor pair 55 includes two capacitors 56 and 57 connected in series between the positive bus Lp and the negative bus Ln.

One end of the second winding 54 of the choke coil 51, namely, the first end 54a, is connected to a neutral point N of the three-phase motor 40. Another end of the choke coil 51, namely, the second end 54b, is connected to a middle point B between the two capacitors 56 and 57 of the capacitor pair 55.

Between the positive bus Lp and the negative bus Ln, a smoothing capacitor 58 is arranged between the capacitor pair 55 (two capacitors 56 and 57) and the first winding 53 of the choke coil 51. In other words, the smoothing capacitor 58 is connected to the positive bus Lp and the negative bus Ln and arranged between the capacitor pair 55 (two capacitors 56 and 57) and the DC power supply 20. Further, a connection node of the smoothing capacitor 58 and the positive bus Lp and a connection node of the smoothing capacitor 58 and the negative bus Ln are located between the capacitor pair 55 (two capacitors 56 and 57) and the DC power supply 20.

The operation of the motor driving device 10 will now be described.

Noise is generated in the inverter 30 during the switching operations of the switching elements Q1, Q2, Q3, Q4, Q5, and Q6 in the inverter 30. This noise propagates from the inverter 30 to the DC power supply 20 via the first winding 53 of the choke coil 51. In this case, current flows from the neutral point N of the three-phase motor 40 to ground via the second winding 54 of the choke coil 51 during the switching operations of the switching elements Q1, Q2, Q3, Q4, Q5, and Q6 in the inverter 30.

In this manner, leakage current having the same phase as that of the noise current is generated in the second winding 54. The leakage current cancels the noise current when the noise current flows through the choke coil 51. This reduces the noise propagating from the inverter 30 to the DC power supply 20. Thus, the propagation of the noise generated in the inverter 30 from the inverter 30 to the DC power supply 20 is reduced.

In this manner, the neutral point N of the motor 40 is connected to one end of the second winding 54 of the choke coil 51, and the middle point B between the capacitors 56 and 57 of the capacitor pair 55 is connected to another end of the second winding 54. This traps the noise, which is generated at the inverter 30, in the motor driving device 10. In other words, by connecting the neutral point N of the motor 40 to the choke coil 51, the noise propagating from the inverter 30 to the DC power supply 20 is cancelled by the leakage current of the same phase. In this case, current D leaks from the neutral point N of the motor 40 to ground in the same manner as the switching noise of the inverter 30 leaking through a path indicated by reference character C in FIG. 1A. The noise current C and the leakage current D have the same phase because of the switching of the inverter 30. Thus, the noise current C is easily cancelled.

In this manner, common mode noise and normal mode noise can both be reduced. Further, the common mode noise and normal mode noise are reduced without increasing the filter constant.

Further, if noise n1 flows from the capacitor pair 55 to the DC power supply 20, the noise n1 is reduced by the smoothing capacitor 58.

The above embodiment has the following advantages.

(1) The motor driving device 10 for a multiphase motor includes the noise filter 50. In the noise filter 50, the first winding 53 and the second winding 54 are wound around the common core 52. The noise filter 50 includes the choke coil 51, of which the first winding 53 is inserted into the positive bus Lp, and the two capacitors 56 and 57, which are connected in series between the positive bus Lp and the negative bus Ln. One end of the second winding 54, namely, the first end 54a, is connected to the neutral point N of the three-phase motor 40. Another end of the second winding 54, namely, the second end 54b, is connected to the middle point B between the two capacitors 56 and 57.

Noise is generated in the inverter 30 during the switching operation of the switching elements Q1, Q2, Q3, Q4, Q5, and Q6 in the inverter 30. This noise propagates from the inverter 30 to the DC power supply 20 via the first winding 53 of the choke coil 51. In this case, current flows from the neutral point N of the three-phase motor 40 to ground via the second winding 54 of the choke coil 51 during the switching operation of the switching elements Q1, Q2, Q3, Q4, Q5, and Q6 of the inverter 30. In this manner, the leakage current having the same phase as the noise current is generated in the second winding 54. The leakage current cancels the noise current when the noise current flows into the choke coil 51. Thus, the noise propagating from the inverter 30 to the DC power supply 20 is reduced. This limits the propagation of the noise generated in the inverter 30 from the inverter 30 to the DC power supply 20. Accordingly, noise is reduced with a simple configuration.

(2) The smoothing capacitor 58 is connected to the positive bus Lp and the negative bus Ln. Further, the smoothing capacitor 58 is arranged between the DC power supply 20 and the two capacitors 56 and 57. Thus, the noise n1 flowing from the two capacitors 56 and 57 (capacitor pair 55) to the DC power supply 20 is reduced by the smoothing capacitor 58.

The present invention is not limited to the above embodiment and may be embodied as follows.

Figure 2:
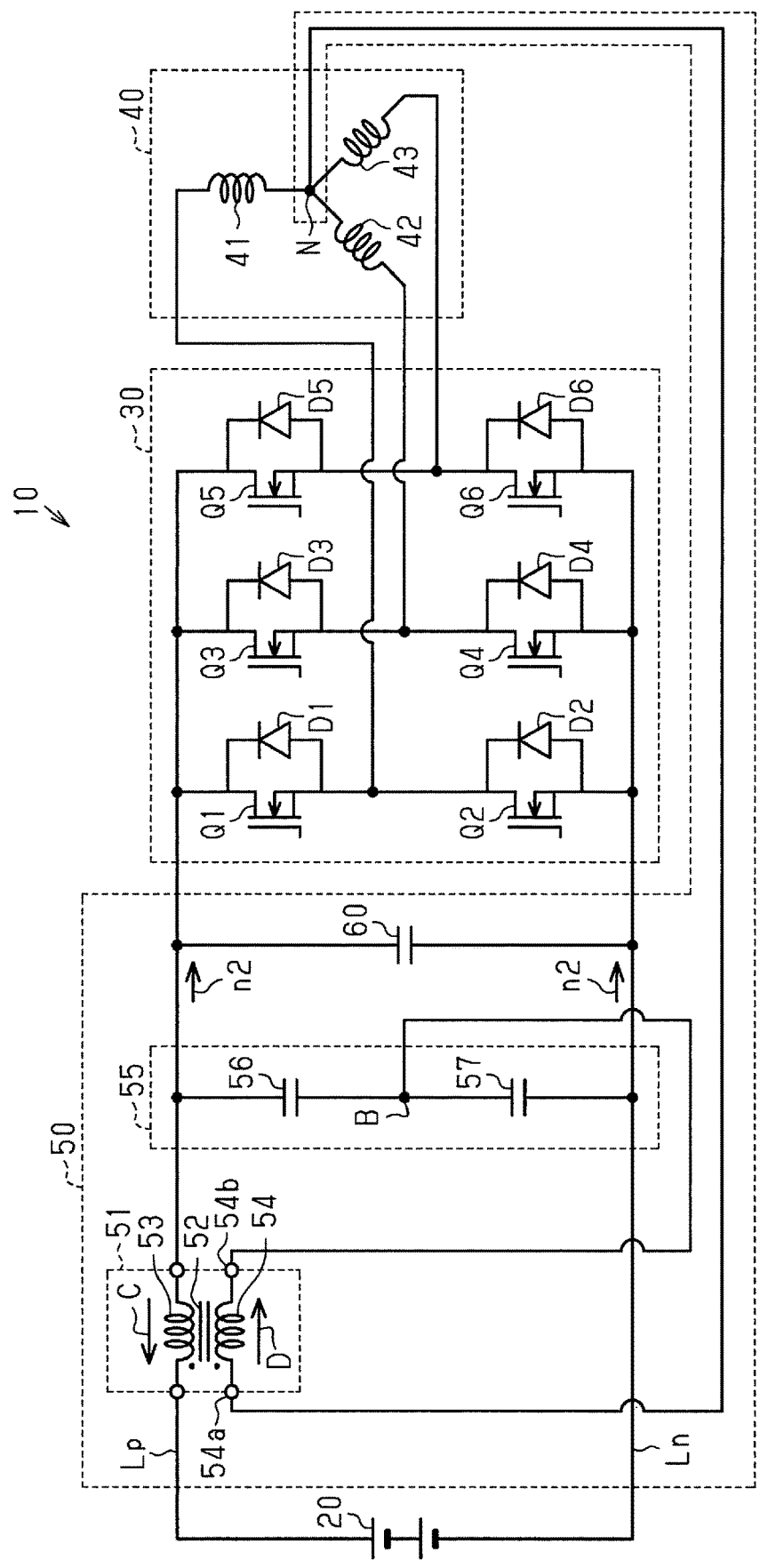
FIG. 2 is a diagram illustrating the configuration of the motor driving device in another example.

In FIG. 1A, the smoothing capacitor 58 is connected to the positive bus Lp and the negative bus Ln and arranged between the DC power supply 20 and the two capacitors 56 and 57 (capacitor pair 55). Instead, as shown in FIG. 2, a smoothing capacitor 60 may be connected to the positive bus Lp and the negative bus Ln and arranged between the inverter 30 and the two capacitors 56 and 57 (capacitor pair 55). A connection node of the smoothing capacitor 60 and the positive bus Lp and a connection node of the smoothing capacitor 60 and the negative bus Ln are located between the inverter 30 and the two capacitors 56 and 57 (capacitor pair 55). In this case, noise n2 flowing from the two capacitors 56 and 57 (capacitor pair 55) toward the inverter 30 is reduced by the smoothing capacitor 60.

Figure 3:
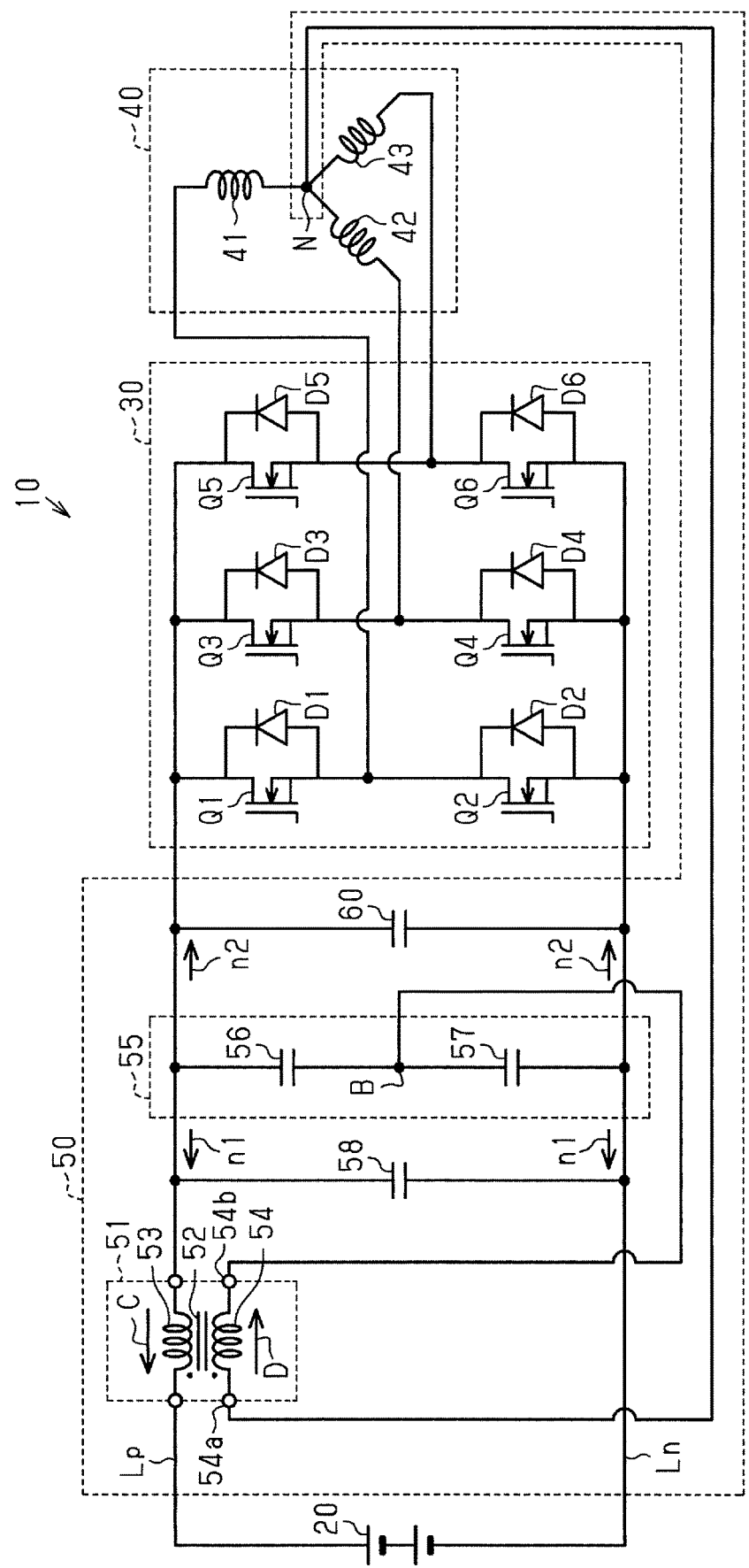
FIG. 3 is a diagram illustrating the configuration of the motor driving device in a further example.

Alternatively, as shown in FIG. 3, two smoothing capacitors 58 and 60 may be connected to the positive bus Lp and negative bus Ln. The smoothing capacitor 58 is arranged between the DC power supply 20 and the two capacitors 56 and 57 (capacitor pair 55). The smoothing capacitor 60 is arranged between the inverter 30 and the two capacitors 56 and 57 (capacitor pair 55). In this case, the noise n1 flowing from the two capacitors 56 and 57 (capacitor pair 55) toward the DC power supply 20 is reduced by the smoothing capacitor 58, and the noise n2 flowing from the two capacitors 56 and 57 (capacitor pair 55) toward the inverter 30 is reduced by the smoothing capacitor 60.

More specifically, the motor driving device 10 may include, between the DC power supply 20 and the two capacitors 56 and 57 or between the inverter 30 and the two capacitors 56 and 57, a single smoothing capacitor 58 connected to the positive bus Lp and the negative bus Ln.

Alternatively, the motor driving device 10 may include two smoothing capacitors 58 and 60 connected to the positive bus Lp and the negative bus Ln, and the two smoothing capacitors 58 and 60 may be arranged between the DC power supply 20 and the two capacitors 56 and 57 and between the inverter 30 and the two capacitors 56 and 57, respectively.

The three-phase motor 40 is employed as the multiphase motor. However, the motor (and inverter) may have any number of phases. The motor may have any form such as an induction motor or a synchronous motor as long as the motor has a neutral point.

The invention claimed is:

1. A motor driving device for a multiphase motor including star-connected coils, the motor driving device comprising:
   a direct-current (DC) power supply;
   an inverter including a plurality of switching elements for configuring upper and lower arms for each phase between a positive bus and a negative bus connected to the DC power supply, wherein the inverter is configured to convert DC power from the DC power supply into alternating-current (AC) power by performing a switching operation with the switching elements; and
   a noise filter configured to reduce noise propagating from the inverter to the DC power supply, wherein the noise filter includes
      a choke coil having a first winding and a second winding wound around a common core, the first winding being inserted into the positive bus, and
      two capacitors connected in series between the positive bus and the negative bus,
      wherein one end of the second winding is connected to a neutral point of the multiphase motor and another end of the second winding is connected to a wire between the two capacitors.

2. The motor driving device according to claim 1, further comprising a smoothing capacitor connected to the positive bus and the negative bus, wherein the smoothing capacitor is arranged between the DC power supply and the two capacitors or between the inverter and the two capacitors.

3. The motor driving device according to claim 1, further comprising two smoothing capacitors connected to the positive bus and the negative bus, wherein the two smoothing capacitors are arranged between the DC power supply and the two capacitors and between the inverter and the two capacitors, respectively.

* * * * *